(12) United States Patent
Chiu

(10) Patent No.: US 8,367,271 B2
(45) Date of Patent: *Feb. 5, 2013

(54) FUEL CELL DEVICE

(75) Inventor: Anthony M. Chiu, Richardson, TX (US)

(73) Assignee: STMicroelectronics, Inc., Coppell, TX (US)

( * ) Notice: Subject to any disclaimer, the term of this patent is extended or adjusted under 35 U.S.C. 154(b) by 300 days.

This patent is subject to a terminal disclaimer.

(21) Appl. No.: 12/414,713

(22) Filed: Mar. 31, 2009

(65) Prior Publication Data

US 2009/0208792 A1 Aug. 20, 2009

Related U.S. Application Data

(62) Division of application No. 10/958,575, filed on Oct. 5, 2004, now Pat. No. 7,547,483.

(51) Int. Cl.
*H01M 8/04* (2006.01)
*H01M 8/10* (2006.01)

(52) U.S. Cl. ........ 429/515; 429/514; 429/513; 429/512; 429/483; 429/482

(58) Field of Classification Search ................. 429/515, 429/514, 513, 512, 483, 482
See application file for complete search history.

(56) References Cited

U.S. PATENT DOCUMENTS

| | | | |
|---|---|---|---|
| 4,661,411 A | 4/1987 | Martin et al. | 428/421 |
| 4,839,247 A | 6/1989 | Levy et al. | 429/19 |
| 5,509,942 A | 4/1996 | Dodge | 29/623.2 |
| 5,759,712 A | 6/1998 | Hockaday | 429/30 |
| 6,136,412 A | 10/2000 | Spiewak et al. | 428/143 |
| 6,485,852 B1 | 11/2002 | Miller et al. | 429/17 |
| 6,653,749 B2 | 11/2003 | Delbridge | 307/85 |
| 6,766,817 B2 | 7/2004 | da Silva | 137/1 |
| 6,777,118 B2 | 8/2004 | Shioya | 429/19 |
| 7,008,711 B2* | 3/2006 | Pondo et al. | 429/423 |
| 2002/0006539 A1 | 1/2002 | Kubota et al. | 429/44 |
| 2002/0100836 A1 | 8/2002 | Hunt | 244/50 |
| 2002/0106540 A1 | 8/2002 | Shioya | 429/19 |
| 2002/0122972 A1 | 9/2002 | Klitsner et al. | 429/42 |
| 2002/0155330 A1 | 10/2002 | Tanaka | 429/19 |
| 2003/0003347 A1 | 1/2003 | D'Arrigo et al. | 429/44 |
| 2003/0031905 A1 | 2/2003 | Saito et al. | 429/26 |
| 2003/0194359 A1* | 10/2003 | Gervasio et al. | 422/198 |
| 2004/0043263 A1 | 3/2004 | Takeyama et al. | 429/19 |
| 2004/0142214 A1 | 7/2004 | Priore et al. | 429/12 |

FOREIGN PATENT DOCUMENTS

| | | |
|---|---|---|
| EP | 1 258 937 | 11/2002 |
| EP | 1 450 428 | 8/2004 |
| WO | 2005/078842 | 8/2005 |

\* cited by examiner

*Primary Examiner* — Helen O Conley

(74) *Attorney, Agent, or Firm* — Allen, Dyer, Doppelt, Milbrath & Gilchrist, P.A.

(57) ABSTRACT

A fuel cell device includes a housing containing a fuel processor that generates fuel gas and a fuel cell having electrodes forming an anode and cathode, and an ion exchange electrolyte positioned between the electrodes. The housing can be formed as first and second cylindrically configured outer shell sections that form a battery cell that is configured similar to a commercially available battery cell. A thermal-capillary pump can be operative with the electrodes and an ion exchange electrolyte, and operatively connected to the fuel processor. The electrodes are configured such that heat generated between the electrodes forces water to any cooler edges of the electrodes and is pumped by capillary action back to the fuel processor to supply water for producing hydrogen gas. The electrodes can be formed on a silicon substrate that includes a flow divider with at least one fuel gas input channel that can be controlled by a MEMS valve.

13 Claims, 5 Drawing Sheets

FUEL CELL DEVICE

RELATED APPLICATION

This application is a divisional of application Ser. No. 10/958,575 filed on Oct. 5, 2004 now U.S. Pat. No. 7,547,483, the disclosure of which is hereby incorporated by reference in its entirety.

FIELD OF THE INVENTION

The present invention relates to fuel cells, and more particularly, this invention relates to fuel cell devices that can be configured as cylindrical battery cells and also reuse the water formed during a fuel cell reaction in a fuel processor while also providing flow control of fuel gas into the fuel cell.

BACKGROUND OF THE INVENTION

Fuel cells have become increasingly more popular each year since the late 1950's when they were first used to power different devices in space exploration vehicles. Large fuel cells are now used to power cars and buses, and smaller fuel cells power electronic devices, including cellular phones and laptop computers. Thus, fuel cells range in size and can be used for a myriad of different applications. The larger fuel cells typically are designed as large stacks of individual fuel cells that power cars or other vehicles. The smallest fuel cells can be formed on silicon and used to power other silicon based devices, even those fabricated on the same silicon chip as the fuel cell itself. Examples of silicon based fuel cells are disclosed in commonly assigned published patent application Ser. Nos. 2003/0003347 to D'Arrigo et al. and 2004/0142214 to Priore et al., the disclosures of which are hereby incorporated by reference in their entirety.

Fuel cells typically produce electricity from an electrochemical reaction that exists between a fuel gas, such as hydrogen, and oxygen provided from the air. In the larger fuel cell devices or systems, a stack of thin, flat or planar configured fuel cells are layered together. The electricity produced by a single fuel cell is combined with other individual, stacked fuel cells to provide enough power for a vehicle or other application that requires far greater power than an individual fuel cell can provide.

Usually, a fuel cell includes an ion exchange electrolyte formed as a polymer membrane that is positioned or sandwiched between two thin "catalyst" layers operative with anode and cathode electrodes that start the reactions and produce the electricity. Hydrogen is fed to the fuel cell and contacts a first catalyst layer as an anode electrode. Hydrogen molecules release electrons and protons. The protons migrate through the electrolyte to the cathode electrode typically as part of a second catalyst layer and react with oxygen to form water. The electrons separated from the protons at the anode cannot pass through the electrolyte membrane and thus travel around it creating an electrical current.

There are many different types of fuel cells, typically depending on the type of electrolyte positioned between the electrodes. For example, many fuel cells use a polymer electrolyte membrane (PEM) and are termed PEM fuel cells. Other fuel cells can be classified as direct methanol, alkaline, phosphoric acid, molten carbonate, solid oxide, and regenerative fuel cells. Regenerative fuel cell technology also produces electricity from hydrogen and oxygen and generates heat and water as byproducts, similar to other fuel cells, such as the PEM fuel cells. The regenerative fuel cell systems, however, can also draw power from a solar cell or other source to split water formed as a byproduct into both oxygen and the hydrogen fuel using electrolysis. NASA is one group that has been active in developing this technology.

Polymer electrolyte membrane (PEM) fuel cells are the better known and more popular fuel cells because they do not require corrosive fluids, and use a solid polymer as an electrolyte, typically with some type of porous electrode that may contain a platinum catalyst. Usually, the PEM fuel cells receive pure hydrogen from a fuel processor that generates hydrogen in some manner or form a hydrogen storage tank or other storage system. The PEM fuel cells typically operate at low temperatures, around 80° C. (176° F.), which allows them to start quickly with less warm-up time. This results in reduced wear, increased durability, greater power per pound of fuel gas, and overall better operation. Usually some type of mobile metal catalyst is operative with the anode, for example, platinum, and separates the hydrogen's electrons and protons. Another catalyst could be operative with the cathode to aid in the reaction using oxygen and air.

In many types of fuel cells, storing hydrogen for sustained fuel cell operation is a drawback and different techniques have been devised for generating and/or storing hydrogen for sustained fuel cell operation. For example, fuel cells store hydrogen chemically using a metal hydride or carbon nanotubes, which are microscopic tubes of carbon, for example, two nanometers across. Whatever type of hydrogen storage or generation is used, however, what distinguishes the fuel cell particularly is the use of an ion exchange electrolyte, such as a polymer electrolyte membrane (PEM), operative as a proton exchange membrane. These types of membranes are typically formed as an ion-exchange resin membrane and can be applied as a very thin film, sometimes even poured or wiped on. PEM is usually made from perfluorocarbonsulfonic acid, sold under the tradename "Nafion," phenolsulfonic acid, polyethylene sulfonic acid, polytrifluorosulfonic acid, and similar compounds. Other examples may include those compounds discussed in the incorporated by reference '347 and '214 patents. Some porous carbon sheets are impregnated with a catalyst, such as platinum powder, and placed on each side of this resin membrane to serve as a gas diffusion electrode layer. This structure and assembly is usually termed a membrane-electrode assembly (MEA) by many skilled in the art.

A flow divider is often operative at the electrodes and anode and cathode. A flow divider at the anode forms a fuel gas passage on one side of the MEA. An oxidizing gas passage can be formed on the other side of the MEA using a flow divider. Distribution plates, separation plates, or other assemblies, including silicon structures as disclosed and claimed in the above-identified '214 and '347 incorporated by reference published patent applications could be operative as flow dividers.

Fuel cells are also becoming increasingly desirable as substitutes for standard AAA, AA, C and D sized dry cell batteries. Many prior art fuel cell devices designed with stacks of individual PEM fuel cells have not been found adequate for application as dry cell battery substitutes. The fuel cells generate water and do not have efficient control of fuel gas into the fuel cell. The generated water could create a problem, as well as storage or generation of any hydrogen gas to enable sustained fuel cell operation. Also adequate control over fuel gas input to the fuel cell is desirable to increase its efficiency and reduce its waste.

SUMMARY OF THE INVENTION

It is therefore an object of the present invention to provide a fuel cell device that can be configured as a cylindrical battery cell, for example, the well-known commercially available, cylindrical dry cell battery.

It is another object of the present invention to provide a fuel cell that can reuse water generated during the fuel cell reaction between oxygen and hydrogen.

It is yet another object of the present invention to provide enhanced control over fuel gas input into the fuel cell.

The present invention is directed to a fuel cell, which in one aspect, includes a first cylindrically configured outer shell section containing a fuel processor that generates fuel gas. A second cylindrically configured outer shell section is aligned and secured to the first outer shell section to form together a cylindrical battery cell. This second outer shell section contains a fuel cell having electrodes forming an anode and cathode. An ion exchange electrolyte is positioned between the electrodes.

The fuel cell receives fuel gas generated by the fuel processor. Air passes into the second outer shell section to provide oxygen in a reaction for generating an electric current. A negative terminal and positive terminal can be positioned at respective ends of first and second outer shell sections opposite to each other and operatively connected to the respective anode and cathode of the fuel cell to form the terminals of a battery cell. In one aspect of the present invention, the first and second outer shell sections are dimensioned such that when secured together are configured as one of an AAA, AA, C or D battery cell.

The electrodes typically are formed as catalytic electrodes that are permeable to the fuel and oxygen gas. The second outer shell section is formed porous to allow air to pass into that section and provide oxygen for reacting with hydrogen in the fuel cell. The first outer shell section can include a conductive shell member operatively connected to the anode, and an insulator over a substantial portion of the conductive shell member to leave an end portion exposed and forming a negative terminal.

The fuel processor preferably generates hydrogen gas and can be formed as a solid fuel material that generates hydrogen gas upon contact with water. In one aspect of the present invention, the solid fuel material generates bubbles of hydrogen. In another embodiment, an electrolysis unit allows hydrogen to be produced by electrolysis of water in a regenerative type of fuel cell system. A metal hydride or nano-tube matrix can store the hydrogen gas produced by the electrolysis of water A solar charger can be used for powering the electrolysis of water.

In yet another aspect of the present invention, the ion exchange electrolyte comprises a proton exchange medium. A diaphragm member preferably separates the first and second cylindrically configured outer shell sections through which hydrogen passes into the fuel cell reactor and can provide some control over water flow by capillary action back to the fuel processor.

In yet another aspect of the present invention, a thermal capillary pump is operative with the electrodes and ion exchange electrolyte and operatively connected to the fuel processor. The electrodes are configured such that heat generated between the electrodes forces water to any cooler edges of the electrodes and is pumped by capillary action back to the fuel processor to supply water for producing hydrogen gas. The fuel cell can include a heater and humidity sensor operative with the fuel cell for initiating a fuel cell reaction to generate electricity based on a sensed capacitance between the electrodes. The heater can include a battery to start the heating process and supply initial energy to the heater.

In yet another aspect of the present invention, the fuel cell can include a silicon substrate on which each of the electrodes are formed. A flow divider can be positioned at the anode and have a tapered input channel through which hydrogen gas flows. Another flow divider can be positioned at the cathode and have a tapered input channel through which air or oxygen flows.

In yet another aspect of the invention, the flow divider at the anode includes at least one fuel gas input channel and a microelectromechanical (MEMS) valve formed at the fuel gas input channel for regulating the flow of fuel gas, such as hydrogen, into the fuel cell. The MEMS valve can be formed on the silicon substrate by techniques known to those skilled in the art.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
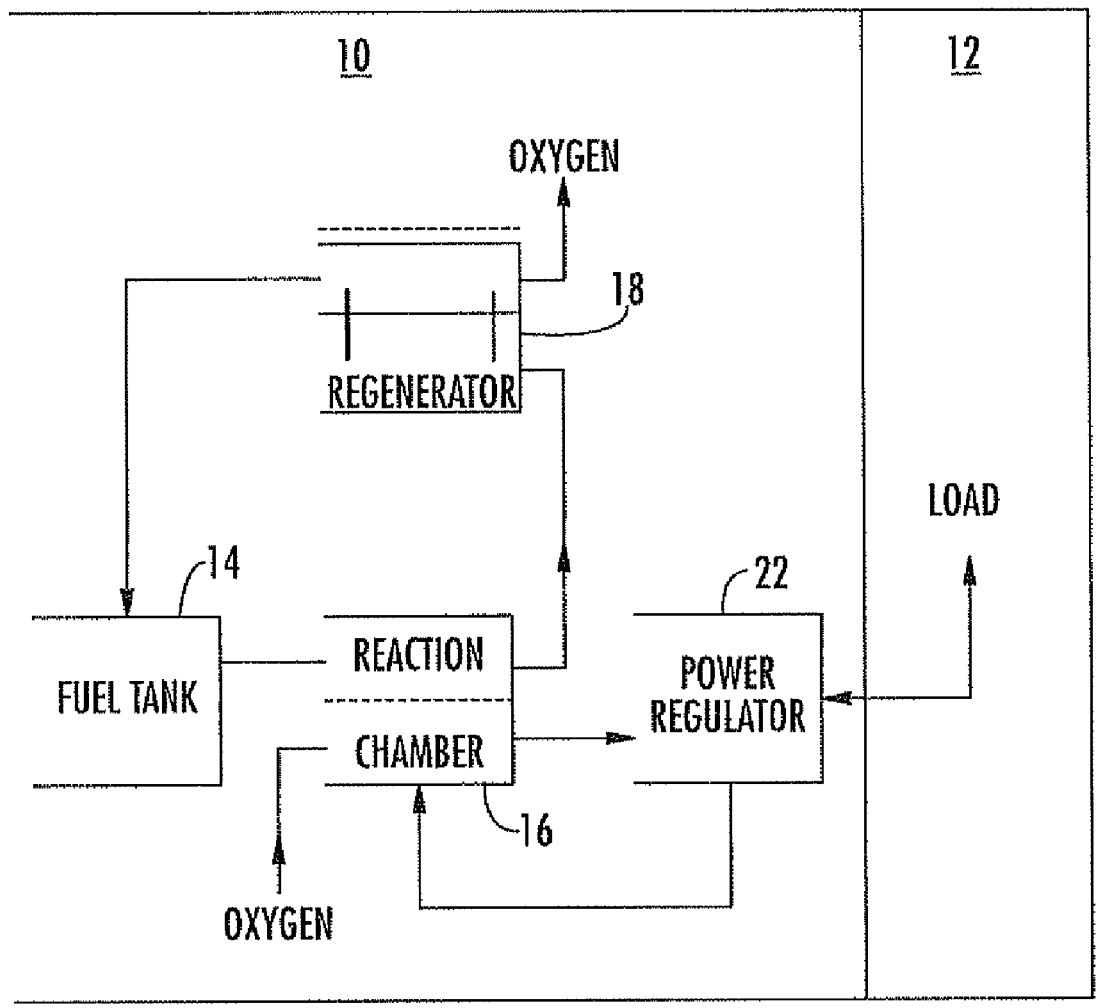
FIG. 1 is a block diagram showing basic components that can be used in a fuel cell device of the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present invention advantageously provides a fuel cell device that can be substituted for a conventional dry cell battery such as a AAA, AA, C or D size battery. The present invention also provides a fuel cell device that includes a fuel cell that can reuse the formed water by pumping the water in an efficient thermal-capillary pump operative with the electrodes and ion exchange electrolyte contained in the fuel cell.

The amount of fuel gas, such as hydrogen gas, flowing into the fuel cell can also be controlled by a microelectromechanical (MEMS) valve formed at a fuel gas input channel of a flow divider. The MEMS valve is formed using semiconductor processing of a silicon substrate, on which a preferred flow divider for the fuel gas and electrode forming the anode is defined.

The fuel cell device of the present invention can include a first cylindrically configured outer shell section that contains a fuel processor that generates fuel gas. A second cylindrically configured outer shell section is aligned and secured to the first outer shell section. Together the outer shell sections are dimensioned and configured to form a cylindrical battery cell. The second outer shell section contains the fuel cell having electrodes forming the anode and cathode. An ion exchange electrolyte is positioned between the electrodes. The fuel cell receives the fuel gas generated from the fuel processor. An oxidant gas, for example, air, can pass through the second outer shell section and supply oxygen for generating an electric current in a reaction together with the fuel gas, e.g., hydrogen. The anode terminal and cathode terminal preferably are positioned at respective ends of first and second outer shell sections opposite each other, and are operatively connected to the respective anode and cathode of the fuel cell. Thus, the fuel cell device of the present invention can be substituted for a typical cylindrically configured dry cell battery.

A thermal-capillary pump is typically operative with the electrodes and the ion exchange electrolyte and operatively connected to the fuel processor. The electrodes can be configured as planar configured members such that heat generated between the electrodes forces water to any cooler edges of the electrodes and is pumped by capillary action in the thermal-capillary pump back to the fuel processor to supply water for producing hydrogen gas, such as based on a reaction of an alloy or other material with water or the electrolysis of water.

By using a silicon substrate in the present invention to define electrodes and/or flow dividers, it is possible to define an anode electrode and a flow divider having a fuel gas input channel and other microchannels through which the fuel gas can flow to engage the electrolyte. The cathode electrode and flow divider for air/oxygen can be formed in a similar manner using a silicon substrate.

Referring now to FIG. 1, there is a block diagram of a fuel cell device 10 connected to a load 12, and showing an example of typical components used in a fuel cell device as one non-limiting example of the present invention. The fuel cell device 10 includes a fuel reservoir (or tank) 14 that provides a fuel gas, for example, hydrogen to a fuel cell reaction chamber 16, also referred in the instant application as the fuel cell. The fuel cell (or reaction chamber) 16 also receives oxygen from the air. The chemical reaction at the anode and cathode forms an electric current and water. It is possible for the water to be pumped, such as by capillary action in a thermal-capillary pump, to a regenerator system 18 where the water is used to produce hydrogen gas from a solid material, for example, an alloy that reacts with water to produce hydrogen gas. Hydrogen could also be produced by electrolysis. Energy for electrolysis can be supplied through an energy input device, for example, a solar cell, thus providing energy for electrolysis of water. The hydrogen can then be stored in the fuel reservoir or tank 14 and oxygen vented to the atmosphere or recycled back to the fuel cell and used again in the fuel cell.

Electricity produced by the fuel cell and supplied to the load 12 could be regulated by any appropriate power regulator 22, as known by those skilled in the art. The fuel cell 16 could be formed on a silicon substrate and formed as a "micro" fuel cell used for powering small devices, including microelectronic devices formed on the same or another integrated circuit chip. The fuel cell 16 could also be formed by a number of fuel cell stacks that are grouped together to form a large fuel cell battery that could power a car or other vehicle.

Figure 2:
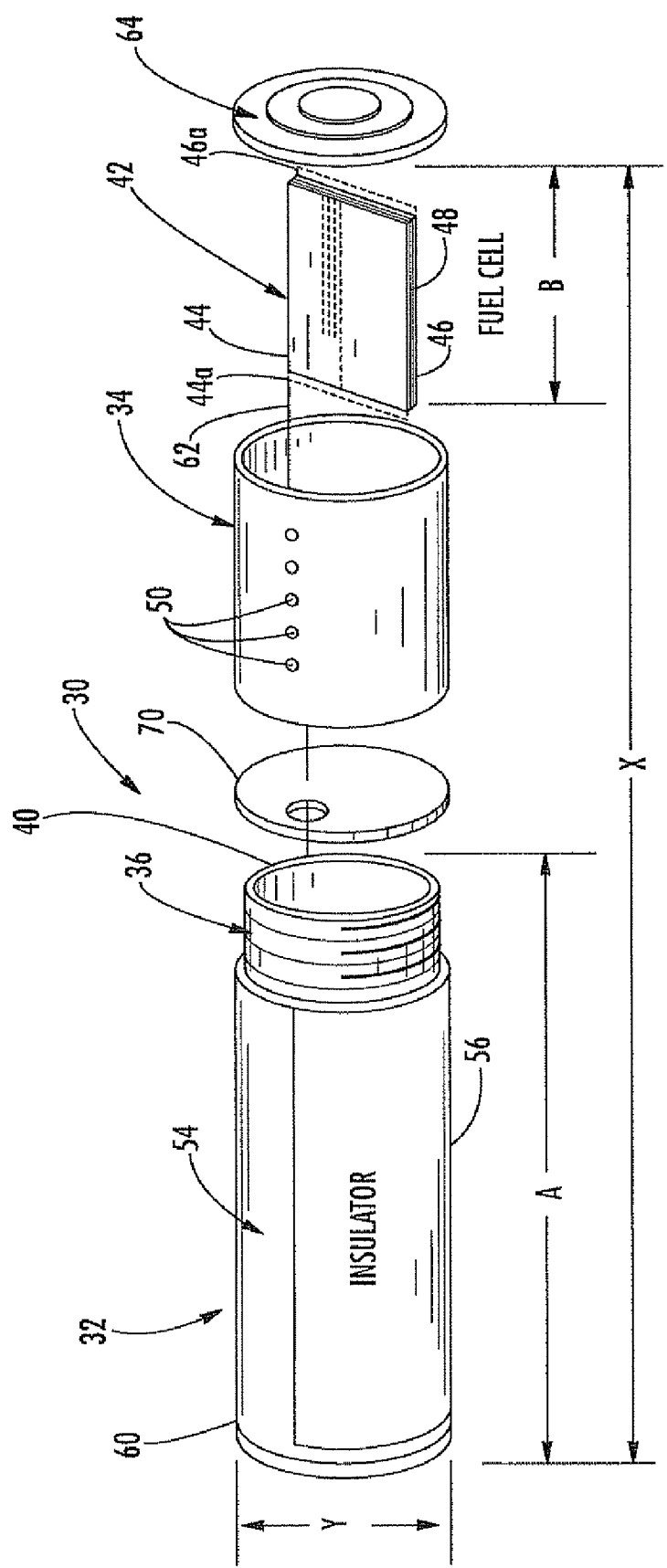
FIG. 2 is a fragmentary, exploded isometric view of a fuel cell device of the present invention that is configured similar to a commercially available dry cell battery.

FIG. 2 is an exploded isometric view of a fuel cell device 30 that can be designed to replace a standard sized dry cell battery, for example, an AAA, AA, C or D sized dry cell battery. The illustrated embodiment of FIG. 2 shows a fuel cell device that is configured as an AA sized battery, with a length "X" that is typically about 50 millimeters and a diameter "Y" that is typically about 14 millimeters. Other dimensions for the fuel cell device can be used for replacing different cylindrically configured and commercially available cylindrical dry cell batteries.

The fuel cell device includes a first cylindrically configured outer shell section 32 that receives in axial alignment a second cylindrically configured outer shell section 34. This second section 34 also forms a coupler. The securing between first and second outer shell sections 32,34 can be accomplished using a threaded connection, for example, by having a threaded extension 36 received into a threaded end of the coupler 34. The first section 32 could be 30 mm (A) and second section 20 mm (B), forming an overall 50 mm length corresponding to a AA cell. Other dimensions for first and second sections and other securing systems for first and second outer shell sections could be used as suggested by those skilled in the art.

The first outer shell section 32 includes a fuel processor 40 that generates a fuel gas, such as hydrogen gas. The second outer shell section 34 contains a fuel cell 42 forming a fuel cell reactor where the electrochemical process occurs. The fuel cell 42 has electrodes, which during reaction form an anode electrode 44 and cathode electrode 46 and an ion exchange electrolyte 48 positioned between the electrodes 44,46. In this non-limiting example, the fuel cell 42 receives fuel gas generated from the fuel processor 40 and an oxygen gas, such as air, through vent holes or pores 50 in the second outer shell section. Different types of pore designs can be used for the present invention to provide airflow into the fuel cell through the second outer shell section.

The electrodes 44,46 preferably are formed as catalytic electrodes that are permeable to the fuel and oxygen gas. For example, some types of carbon fiber paper could be used for electrode material because it is porous, hydrophobic, conductive and non-corrosive. A catalyst at the electrodes allows the hydrogen gas to split into the protons and electrons necessary for the reaction. Another catalyst can aid in producing the oxygen from air. Electrodes 44,46 provide an interface between reacting gases and the electrolyte 48 and allow wet gas permeation and provide a reaction surface where the reactant gases contact the electrolyte. As noted before, usually a catalyst is added to the surface of each electrode 44,46 and contacts the electrolyte 48 to increase the rate at which a chemical reaction occurs. Platinum can be used because of its high electrode-catalytic activity, stability, and electrical conductivity. Hydrogen can flow from the anode electrode 44 through the ion exchange electrolyte 48, while oxygen in the air can attract hydrogen protons through the ion exchange electrolyte to combine and form water as part of the electrochemical process.

Typically, a solid polymer electrolyte is used and formed as a thin membrane or plastic film, and forms a polymer electrolyte membrane (PEM) fuel cell. Typically, the polymer electrolyte membrane can be a plastic-like film that ranges from 50 to about 175 microns and can be formed from perfluorosulfonic acids and similar acids that are Teflon-like fluorocarbon polymers having side chains ending in sulfonic acid groups ($-SO_3^2$). Representative, non-limiting examples of acid derivatives that can be used for the polymer include perfluorosulfonic acid and sold under the tradename "Nafion", phenolsulfonic acid, polyethylene sulfonic acid, polytrifluorosulfonic acid, and similar compounds.

In one aspect of the present invention, the first outer shell section 32 includes a conductive shell member 54 with an insulator 56 positioned over a substantial portion of the conductive shell member and leaving an end portion exposed for forming a negative terminal 60. The design of the negative terminal 60 can be accomplished by designing the anode electrode 44 to include an extension 44a and connecting the anode to the conductive shell member 54 by connecting a conductive strip 62 to the anode and extending it back to the conductive shell member 54, while leaving exposed only the end to form the negative terminal 60. A positive terminal is typically formed as a disk-shaped cap 64 that is received over the second outer shell section (or coupler) 34. The fuel cell 42 can include the cathode electrode 46 with an extension 46a that can be securely attached to the positive terminal 64, which will be coupled to the second outer shell section forming the coupler. Thus, the fuel cell 42 would be locked in place within the coupler.

A diaphragm 70 is preferably positioned between the first and second cylindrically configured outer shell sections 32,34 through which hydrogen passes into the fuel cell 42 and water passes back into the fuel processor 40 contained in the first outer shell section to form water as will be explained in greater detail below. The diaphragm can be designed with certain porosity to regulate some water flow back to the fuel processor, and prevent backflow of water. It could also allow only one way passing of hydrogen into the coupler section holding the fuel cell. Furthermore, in yet another implementation, this diaphragm can wave back and forth to produce a pumping action, to push the gases (oxygen and hydrogen) into the reactor. This pumping action is created by a piezoelectric element attached to the center of the diaphragm, and anchored onto the edge of the reactor facing the diaphragm.

Figure 3A:
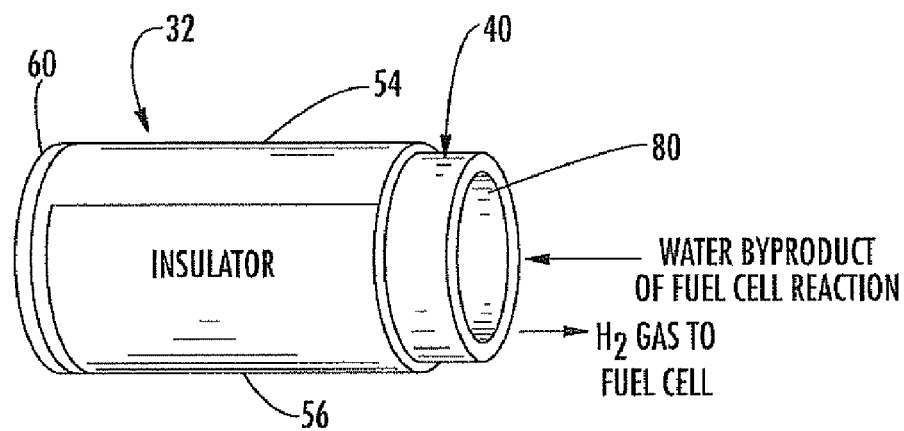
FIG. 3A is an example of a fuel processor having a solid fuel that can react with water byproduct to produce hydrogen for the fuel cell in accordance with one non-limiting example of the present invention.
Figure 3B:
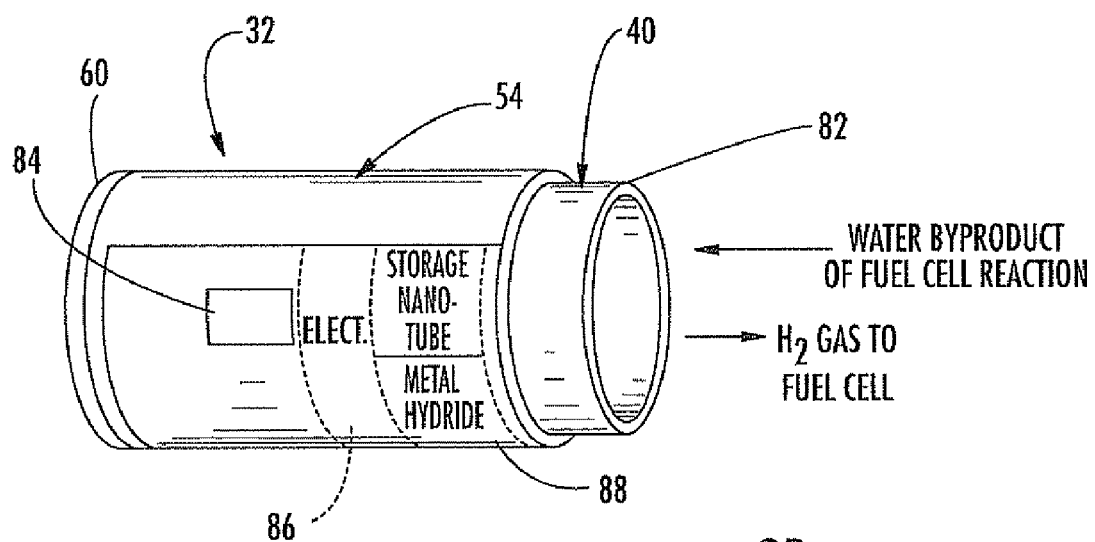
FIG. 3B is another embodiment of the fuel processor that produces hydrogen by electrolysis of water using solar energy in accordance with another non-limiting example of the present invention.

FIGS. 3A and 3B show two different embodiments of a fuel processor 40. FIG. 3A shows a fuel processor 40 using a solid fuel 80 that acts as a fuel preform and reacts with water or a water byproduct from the fuel cell reaction to produce hydrogen and oxygen. Such solid fuels can also be a gel. These fuels are manufactured by different companies, including Alternative Energy Conversion, Inc. of Canada. The solid fuel 80 reacts with water and could be formed as a metallic, alloy component in which the increase or decrease of the hydrogen yield can be controlled by mixing various components. For example, the solid fuel 80 could be formed as an alloy tablet with different pH effecting chemicals. Hydrogen bubbles could bubble out at a particular rate when mixed with a certain amount of water. Hydrogen could thus run a desired application on-demand. These solid fuel 80 compounds can be formed from various alloys of zinc, aluminum and/or other materials that produce hydrogen upon contact with water, typically in a pH sensitive environment, for example, such as controlled by sodium hydroxide (NaOH) or similar agents, as one non-limiting example. Water can be provided by the fuel cell reaction, as a byproduct from the fuel cell. The water is pumped back to the fuel processor to provide the water necessary for hydrogen gas production. This fuel cell battery can be charged by adding drops of water into this fuel processor before the first use.

FIG. 3B is another embodiment of the fuel processor 40 that includes a renewable fuel 82 operable as part of a regeneration process in which hydrogen is produced by the electrolysis of water. Solar cells 84 on the outer surface of the first outer shell section can receive sunlight and provide energy as a solar charger. Appropriate electrical connections extend from the solar cells 84 to an electrolysis unit 86 within the outer shell section 32. The energy derived from the solar cells 84 powers the electrolysis unit 86 to produce hydrogen and oxygen from water produced during the fuel cell reaction. When the hydrogen gas is produced, it can be stored by absorption either in a metal hydride or nano-tube matrix 88, as non-limiting examples of a hydrogen storage device.

Figure 4:
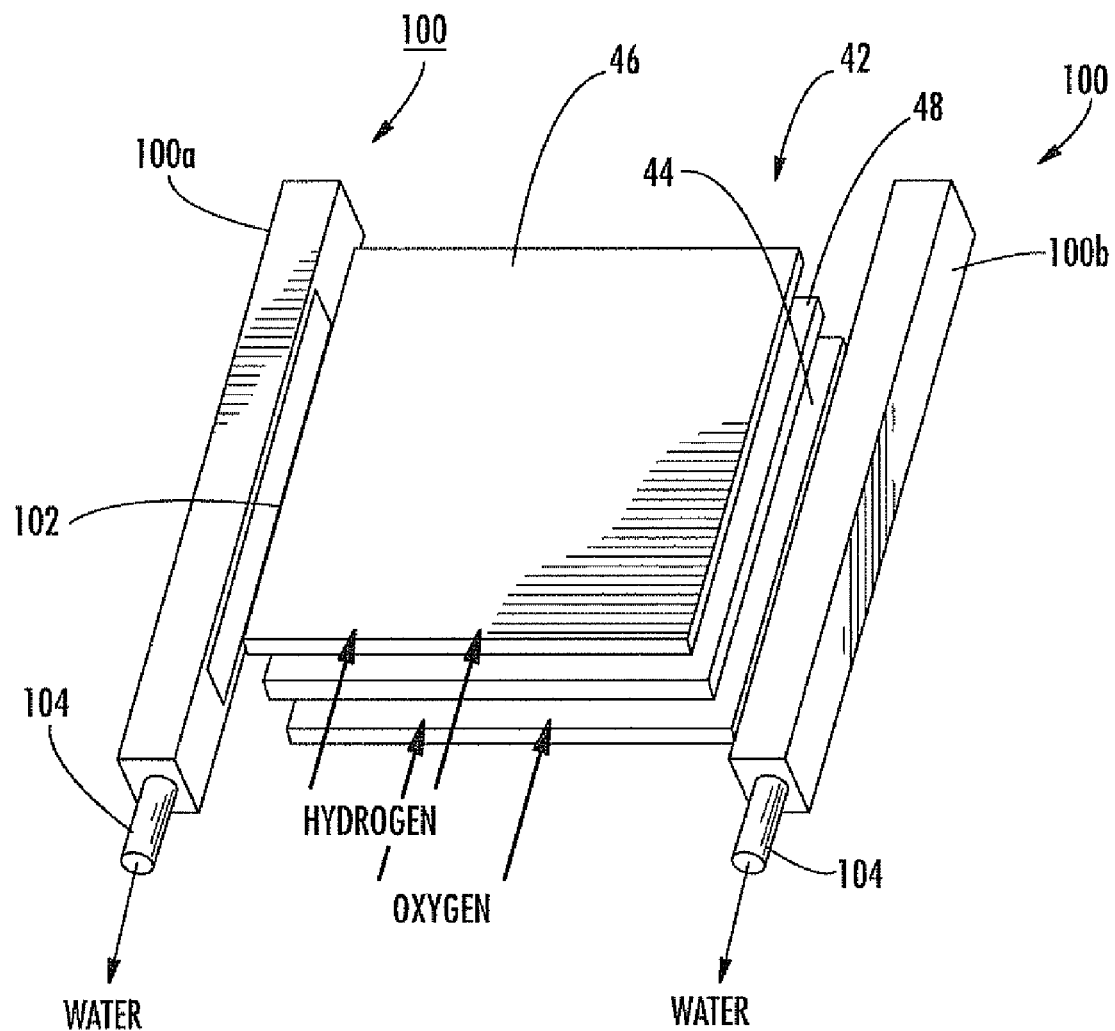
FIG. 4 is a fragmentary, exploded isometric view of an example of a fuel cell in accordance with the present invention, and showing opposing electrodes, a proton exchange membrane positioned therebetween, and a thermal-capillary pump that allows water to be collected and pumped by capillary action back to a fuel processor.

FIG. 4 shows a thermal-capillary pump 100 formed as two edge sections 100a, 100b that are operative with the fuel cell 42, which includes planar configured electrodes 44,46 and a planar configured ion exchange electrolyte 48 preferably formed as a polymer electrolyte membrane. It is well known to those skilled in the art that the fuel cells can produce heat upon reaction. The thermal-capillary pump is formed as two edge sections 100a, 100b that engage and are operative with the anode electrode and cathode electrode and ion exchange electrolyte and operatively connected to the fuel processor 40. The electrodes 44,46 are configured such that heat generated between the electrodes forces water to any cooler edges of the electrodes and is pumped by the two edge sections 100a, 100b of the thermal-capillary pump 100 by capillary force back to the fuel processor 40 to supply water for producing hydrogen gas. The diaphragm 70 can provide some control over how much water the fuel processor receives as noted before.

The thermal capillary pump 100 includes a porous intake area 102 on each edge member 100a, 100b that receives the water that had been forced to the edges of the electrodes. The capillary pores in the porous intake area 102 allow water to flow into the main section of the thermal capillary pump positioned at each side of the fuel cell and be discharged by capillary action through a discharge tube 104 that can be a microchannel formed in silicon or a larger tube. The tube 104 thus could be a few microns or millimeters in diameter, depending on the fuel cell design or amount of water to be passed back into the fuel processor 40. Naturally, if the fuel cell is designed as a micro fuel cell, such as the type set forth in the commonly assigned and incorporated by reference '347 and '214 published patent applications, the discharge tube 104 for the thermal-capillary pump would be very small in diameter and could be formed on a silicon substrate.

Figure 5:
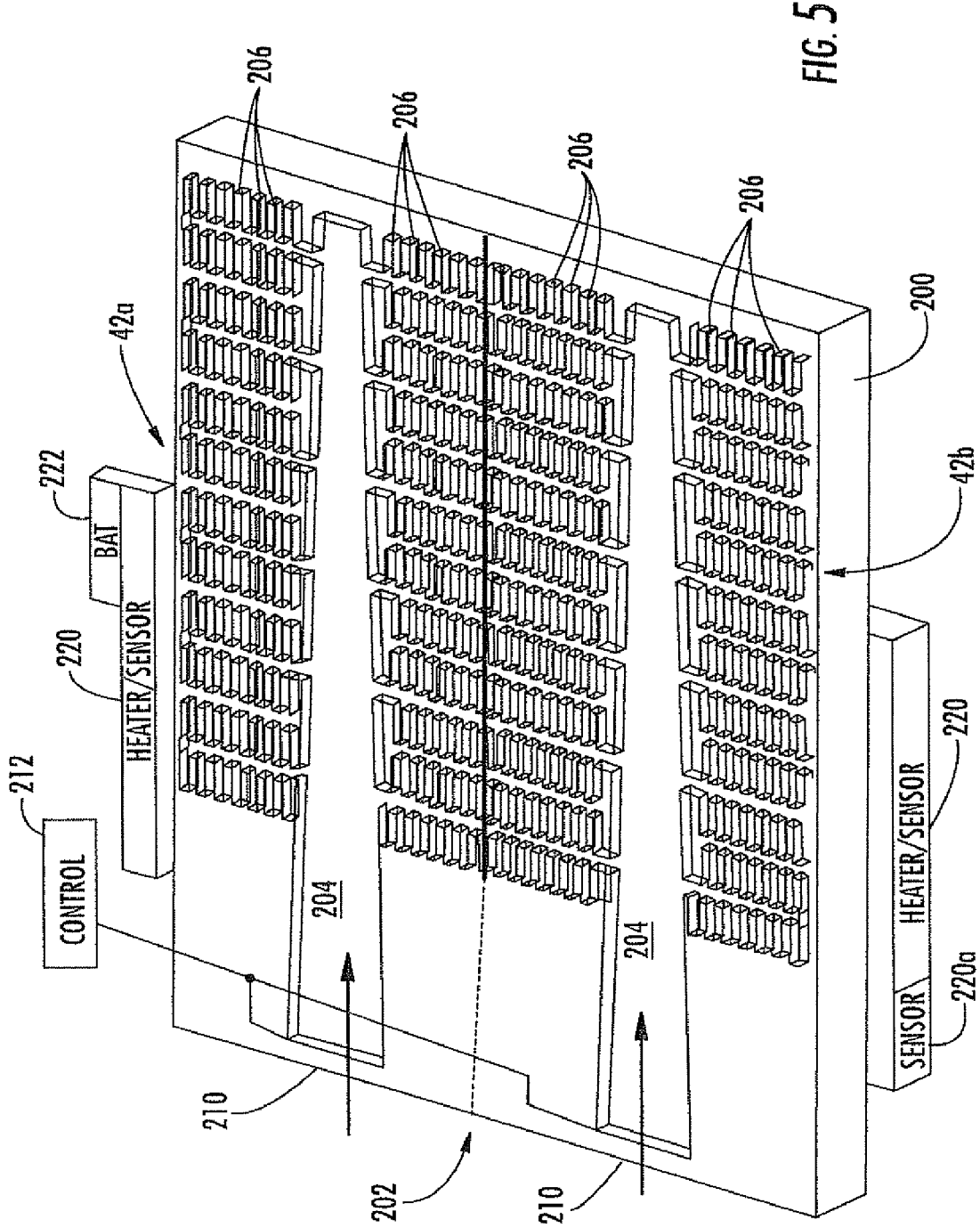
FIG. 5 is a fragmentary isometric view of a portion of a fuel cell formed as two separate cells, and showing a silicon substrate, flow divider for fuel gas, and flow input channel incorporating a MEMS valve for regulating flow of fuel gas in accordance with one example of the present invention.

FIG. 5 shows one type of low pressure flow divider design forming a diffuser and reactor of the fuel cell used as one non-limiting example of the present invention. FIG. 5 shows a silicon substrate 200 that forms part of the anode electrode 44 of the fuel cell or similar device. The silicon substrate 200 has a formed flow divider 202 for fuel gas and an anode electrode is defined thereon. This particular embodiment shown in FIG. 5 has two separate fuel cell structures 42a, 42b that produce about 1.2 to about 1.6 volts. The fuel cell 42 includes the silicon substrate 200 and flow divider 202 and anode electrode defined thereon. Two fuel gas input channels 204 are illustrated, one for each cell structure 42a, 42b as illustrated.

Many smaller fuel microchannels or gas flow tracks 206 branch out from the primary fuel gas input channels 204 and provide the numerous fuel gas channels through which the fuel gas can diffuse throughout the anode electrode and ion exchange electrolyte. The two fuel gas input channels 204 are preferably tapered to increase the fuel gas velocity and enhance low pressure, diffusion flow of the fuel gas through the defined microchannels 206. It should be understood that different techniques can be used for forming the different microchannels 206 and structure as described, including silicon processing techniques described in the incorporated by reference published patent applications and other silicon processing techniques known to those skilled in the art. The cathode electrode (not shown) can be similarly formed with different tapered gas flow input channels for oxygen and capillary microchannels through which oxygen can diffuse to the cathode electrode and electrolyte.

As shown in FIG. 5, because a silicon substrate is used, a microelectromechanical (MEMS) valve 210 can be formed at each fuel gas input channel 204 and regulate the flow of fuel gas into the input channel. The MEMS valve could be a balanced beam, cantilever or other structure to form a valve that can be controlled in various open conditions. A MEMS controller 212 can be connected to each MEMS valve 210 to control actuation of the MEMS valve and control fuel gas flow into the fuel cell. A heater and humidity or temperature sensor 220 can be provided and operative with the fuel cell. The humidity or temperature sensor portion 220a can work by measuring capacitance between the two parallel, conducting elements, and based upon the measured capacitance, initiate operation of the heater to initially start the reaction, which may take added heat provided by the heater. A battery 222 can be supplied for powering the heater for initial start-up. The heater, humidity sensor and/or temperature sensor could be formed as MEMS circuits, using polysilicon as conductors, depending on the design used and the type of silicon substrate and the manufacturing process as used for the present invention. The MEMS controller 212 could also be used to control the heater 220 and regulate the power.

The PEM 48 could be formed as a gel or polymer that can be wiped onto the structure shown in FIG. 5. The incorporated by reference '214 and '347 patent publications disclose in the background and specification various other prior art references and teachings for PEN and similar materials that could be modified or used in the present invention to provide a PEM that could be wiped onto the structure or even poured.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A fuel cell device comprising:
    a fuel cell housing;
    a fuel processor received within the housing that generates fuel gas;
    a fuel cell received within the housing and comprising,
    a planar-configured silicon substrate having a flow divider formed thereon as a plurality of micro-channels on the silicon substrate for fuel gas and an electrode formed on one side of the silicon substrate and defining a planar configured anode, said flow divider including substantially planar fuel gas input channels that extend along the substrate to define fuel cell structures;
    a microelectromechanical (MEMS) valve formed at each fuel gas input channel and configured to regulate the flow of fuel gas into the at least one fuel gas input channel;
    a planar configured electrode forming a cathode;
    a planar configured ion exchange electrolyte positioned between the electrodes forming the anode and cathode that receives fuel gas from the fuel processor and oxygen and configured to generate an electric current wherein protons pass from the anode through the ion exchange membrane and oxygen passes from the cathode to combine with protons to form water; and
    a thermal-capillary pump operative with the electrode and ion exchange electrolyte and operatively connected to the fuel processor wherein the electrodes are configured such that heat generated between the electrodes forces water to any cooler edges of the electrodes as is pumped by capillary action back to the fuel processor to supply water for producing hydrogen gas production.

2. A fuel cell device according to claim 1, and further comprising a heater and humidity sensor operative with said fuel cell for initiating a fuel cell reaction to generate electricity.

3. A fuel cell device according to claim 1, wherein said flow divider has a tapered input channel through which hydrogen gas flows onto said electrode forming the anode.

4. A fuel cell device according to claim 1, and further comprising a diaphragm member separating said fuel processor from said fuel cell.

5. A fuel cell device according to claim 1, wherein said housing comprises a first outer shell section that receives said fuel processor and a second outer shell section that receives said fuel cell.

6. A fuel cell according to claim 5, wherein said first and second outer shell sections comprise axially aligned, cylindrically configured shell sections that are dimensioned to form a battery cell.

7. A fuel cell according to claim 5, and further comprising a negative terminal and positive terminal positioned at respective ends of first and second outer shell sections opposite each other, and operatively connected to the respective anode and cathode of said fuel cell.

8. A fuel cell according to claim 5, wherein said second outer shell section comprises a porous structure to allow air to pass for providing oxygen for fuel cell operation.

9. A fuel cell according to claim 5, wherein said first outer shell section comprises a conductive shell member operatively connected to said anode.

10. A fuel cell according to claim 9, and further comprising an insulator over a substantial portion of said first outer shell section and leaving an end portion exposed and forming a negative terminal.

11. A fuel cell according to claim 1, wherein said electrodes comprise catalytic electrodes permeable to the fuel and oxidant gas.

12. A fuel cell according to claim 1, and further comprising a metal hydride or nano-tube matrix within said fuel processor that stores hydrogen gas.

13. A fuel cell according to claim 1, wherein said ion exchange electrolyte comprises proton exchange medium.

* * * * *